Figure 1:
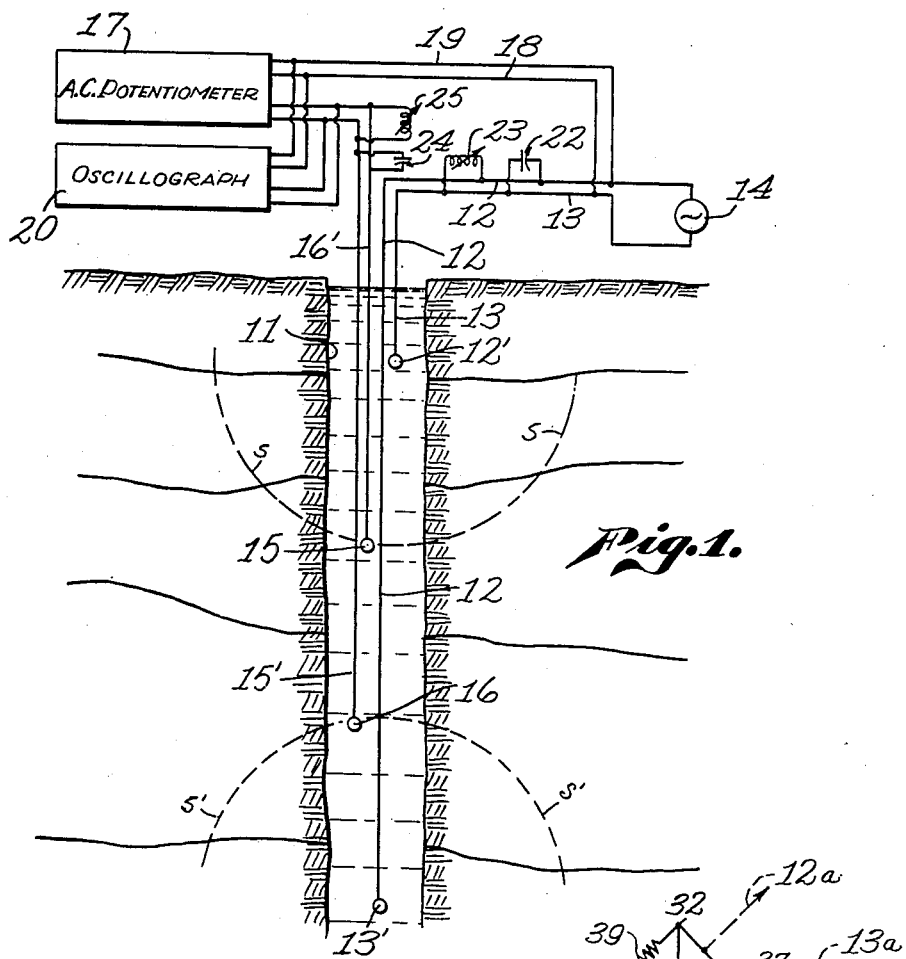

April 12, 1938.　　　R. W. LOHMAN　　　2,114,056
METHOD FOR ELECTRICALLY INVESTIGATING SUBTERRANEAN STRATA
Filed July 1, 1935

Inventor
Ralph W. Lohman
By [signature]
Attorney

Patented Apr. 12, 1938

2,114,056

UNITED STATES PATENT OFFICE 2,114,056

METHOD FOR ELECTRICALLY INVESTIGATING SUBTERRANEAN STRATA

Ralph W. Lohman, South Pasadena, Calif., assignor to Elliott Core Drilling Company, a corporation of California Application July 1, 1935, Serial No. 29,228

5 Claims. (Cl. 175—182)

This invention has to do in a general way with the electrical investigation of subterranean formations adjacent a bore hole for the purpose of obtaining at the surface of the ground a sensible indication or measurement which is commensurate with and indicative of the physical characteristics of the subterranean formation investigated. My invention is particularly adapted for use in connection with oil well operations for the detection and location of oil bearing strata.

I am aware of the fact that attempts have heretofore been made to determine the character and contents of subterranean formations through the medium of resistivity measurements taken either at the surface of the ground or through a bore hole. Under such measurements a low resistivity presumably indicates a water sand and a high resistivity presumably indicates an oil sand. I have discovered, however, that measurements of this character are not reliable due to the fact that the porous strata containing the oil may also contain salt or other electrolytes in varying degrees and in many instances I have discovered that a fresh water sand has a higher resistivity than an oil sand even though the latter may contain only a fraction of one per cent. of salt water.

It therefore becomes a primary object of this invention to provide a method and apparatus of the class described in which the electrical characteristics of the strata which I employ for obtaining sensible indications at the surface of the ground are commensurate with the majority content of the strata and are not appreciably affected by the presence of a relatively small amount of electrolyte as is the case in the resistivity methods.

Pursuant to this objective my invention contemplates the utilization of the inductance and capacitance of subterranean formations in obtaining indications or measurements at the surface of the ground which are commensurate with and indicative of the character and contents of such formations. Since the phase relationship between the current and the potential of electrical energy which is artificially passed through a predetermined volume of formation is dependent upon the inductance and capacitance of such formation, as will be hereinafter more fully explained, my invention contemplates the determination and measurement of such phase relationship as one means for investigating the character and contents of the formation. My invention also contemplates a direct measurement of the inductance or the capacitance or both of predetermined volumes or a predetermined volume of subterranean formation adjacent a bore hole and the utilization of such measurements as another means for locating and identifying the character and contents of subterranean strata or formations.

The elementary theory upon which this invention rests may be outlined as follows: By the term "phase relationship" as used herein, I have reference to the angle of lag or the angle of lead between the current and the voltage causing it. The angle of lag of current referred to the voltage causing it in an earth circuit is produced primarily by the eddy currents generated in the large cross section of the conductor being measured, which in turn produce an unequal distribution of current across the large area of the conductor and consequently set up the well known "skin effect" which causes an otherwise non-inductive conductor to act as though it contained true reactance. The inductance, therefore, of such an earth circuit is a direct function of the angle of lag and has been experimentally found by me to be ρ unique characteristic indicative of the physical properties and contents of the particular strata or formation which constitutes the earth's circuit under investigation.

The angle of lead in such an earth circuit is due to the fact that the materials of the strata or formation under investigation, as a result of their structure and content, possess various values of the dielectric constant whereby capacity is introduced into the earth's circuit such capacity being effective to cause the current to lead the voltage producing it.

With these facts in mind, therefore, it will be seen that by passing current through a predetermined volume of formation, defined by two vertically spaced points in a bore hole, and determining the phase relationship between such current, and the potential difference which results therefrom, between two other vertically spaced points in the bore hole, I am able to obtain a sensible indication at the surface of the ground which is commensurate with and indicative of the character and contents of the section or volume of formation under investigation.

The angle of lag or the angle of lead present in a given earth's circuit will for the reasons set forth above vary over relatively great ranges and since such variations can be readily measured it will be seen that this particular method of my invention has the advantage of not only being reliable but further of being extremely sensitive. For example in actual practice angles of lag or angles of lead, depending upon the characteristics of the strata, up to 30 degrees or more have often been observed.

It is a further important feature of the method contemplated by this invention that the dielectric constant of any porous strata is principally governed by the specific inductance capacity of the liquid within such strata and since the specific inductive capacity values range from say, 3 to 4 for oil to a value of about 80 for water, it will be apparent that a very great difference in the angle of lead between an earth's circuit composed of oil sand and one composed of water sand can be obtained.

As has been indicated herein above, my invention is not restricted to the determination of the phase relationship referred to, as a means for indicating the inductance and capacity of subterranean formations, but it also contemplates methods whereby the inductance and capacity may be measured directly and apparatus for obtaining such measurements.

Figure 2:
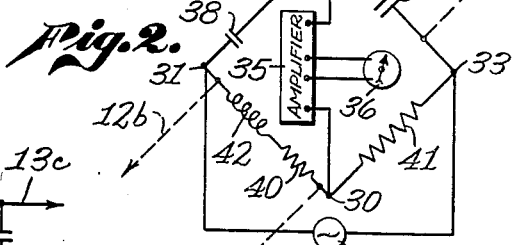
Figure 3:
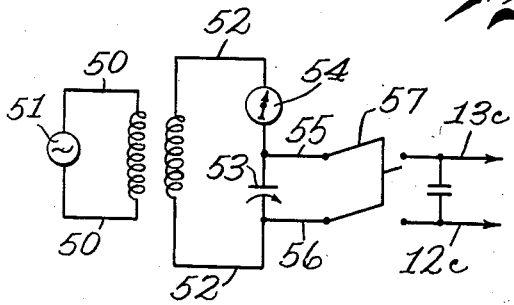

The details in the procedures or methods contemplated by this invention together with details in certain preferred circuits and apparatus for practicing the same will be best understood from the following description of the accompanying drawing which is chosen for illustrative purposes only and in which Fig. 1 is a sectional elevation of a portion of a bore hole associated with a wiring diagram showing one preferred form of circuit which may be employed in the practice of this invention;

Fig. 2 is a wiring diagram of another circuit contemplated by this invention which may be employed for the purpose of obtaining direct capacity and inductance measurements of the subterranean strata or formations; and Fig. 3 shows a wiring diagram of another form of circuit which may be employed in the practice of this invention.

Referring now to the drawing with particular reference to Fig. 1, numeral 11 indicates a section of a bore hole which is filled with a suitable fluid such as drilling mud, water or oil. Suspended within the bore hole 11 by means of suitably insulated conductors 12 and 13 are a pair of vertically spaced electrodes 12' and 13'. Alternating current of predetermined frequency is delivered to the conductors 12 and 13 from any suitable source of power such as an alternator or oscillator indicated by reference numeral 14.

The current thus supplied to the electrodes 12' and 13' is conducted through the mud or other fluid in the bore hole into the adjacent formation and is effective in establishing equipotential spheres about the electrodes such spheres being indicated by reference numerals s and s'. Since the purpose of the invention is to measure the electrical properties of the formation adjacent a bore hole, it is important that the electrodes 12' and 13' be spaced a sufficient distance apart so that the equipotential spheres s and s' established about these electrodes have volumes such that the surface areas thereof are substantially greater than the cross-sectional area of the bore hole. In this way the effect of the fluid within the bore hole becomes negligible as compared with the effect of the strata which forms a majority of the sphere and which comprises the majority of the equipotential surfaces between which the measurements are made.

In this form of my invention the volumes of the two equipotential spheres s and s' and the consequent surface areas which are taken into consideration are determined by a second pair of electrodes 15 and 16 which are shown as being positioned in spaced relation with each other between the two electrodes 12' and 13'. For most satisfactory operation I prefer to support the electrodes 15 and 16 so that they are equidistant from each other and the electrodes 15 and 16 are equidistant from the electrodes 12' and 13' respectively. Insulated conductors 15' and 16' are shown as being connected to the electrodes 15 and 16 and it is preferable for convenience in operation that all of the conductors be combined in a single cable, the spacing of the respective electrodes being governed by the respective lead conductors to which they are attached.

With the arrangement just described current is passed between the electrodes 12' and 13' from the alternating source of power 14, and the electrodes 15 and 16 are utilized for the purpose of receiving, for conduction to the surface of the ground, the potential difference between two equipotential spheres s and s'. The current and the potential thus applied and received are employed through the medium of suitable instruments to determine the phase relation or the angle of lead or the angle of lag between the current passing across that portion of the earth's circuit between electrodes 12' and 13' and the potential resulting from such current across that portion of the earth circuit between the electrodes 15 and 16.

For the purpose of obtaining the measurements of the angle of lead or the angle of lag I may employ an alternating current potentiometer of the polar type which is indicated diagrammatically at 17. The details in the construction and the operation of such an alternating current potentiometer may be found in the Journal of the Institute of Electrical Engineers for March 1930, on page 339 and will not be described and illustrated in detail herein. Suffice it to say that the "reference side" of the potentiometer is connected through conductors 18 and 19 with the supply or "input" conductors 12 and 13 and the other side of the potentiometer is connected directly to the conductors 15' and 16'. This instrument is provided with means for reading directly the phase relationship between the current and the potential in the earth's circuit described above.

Instead of or in addition to the A. C. potentiometer 17 I may employ an oscillograph 20 which is shown as being connected to the conductors 18 and 19 and the conductors 15' and 16' respectively. As the electrodes are passed along the axis of the well I may by means of this oscillograph obtain a continuous indication or graphical record of the phase angles with reference to the position of the electrodes in the well whereby the character and contents of any portion of the subterranean formation through which the electrodes have passed can be readily determined.

It is appreciative that in deep wells the capacity and inductance of the cable circuit which is employed to convey the energy to and from the subterranean earth's circuit will be large and will be superimposed upon the similar values measured in the formation itself. For the purpose of eliminating or compensating for these conductor or cable constants and thereby increasing the accuracy of the record or indications obtained, I may resort to several alternative procedures.

For example, the cable constants can be compensated for by operating or supplying the electrical energy at a frequency in the region of the resonant frequency of the cable at which the impedance of the cable becomes reduced to its resistance. Also these factors can be eliminated by adding a suitable neutralizing inductance or capacity to the cable circuits manually or automatically as it is paid out.

In carrying out this last mentioned procedure I may first calibrate the cable by making a preliminary run with the electrodes insulated thereby obtaining a curve or curves of the inductance and capacity of the cable as it is paid out from the drum. From these values I may construct variable condensers and variable inductance coils the plate and coil shapes of which can be formed, in the manner well known to those familiar with the art, so that by operating these inductance coils and condensers (either manually or automatically) in timed relation with the movement of the cable the inductance and capacity constants of the cable are automatically compensated for. In Fig. 1, reference numerals 22 and 23 indicate a variable condenser and a variable inductance coil respectively and illustrate the manner in which they may be connected to the conductors 12 and 13. Reference numerals 24 and 25 indicate a corresponding condenser and inductance coil respectively which are connected across the conductors 15' and 16'.

As was previously pointed out in the specification, my invention is not necessarily restricted to obtaining indications of inductance and capacity by means of the phase angle relation in the procedure described above, it also contemplates the direct measurements of the inductance and capacitance in successive subterranean volumes of formation adjacent a bore hole. Such direct measurements of these two values may be made by suitable shielded ratio boxes, or by capacity or inductance bridges, or by resonance methods and in such cases only one or two lead wires will be required to be passed down the bore hole in order to obtain the measurements or indications.

In Fig. 2 I show an alternating current bridge circuit which may be employed for measuring both the inductance and the capacitance of the strata directly. In this figure reference numerals 30—31, 31—32, 32—33, and 33—30 indicate the four arms of a Wheatstone bridge circuit. Electrical energy is applied across the terminals 31 and 33 from a suitable source indicated at 34 and the terminals 30 and 32 are connected through an amplifier 35 to a galvanometer 36. Condensers are shown at 37 and 38, resistances at 39, 40 and 41 and an inductance is indicated at 42.

In using this bridge two insulated conductors with vertically spaced electrodes on their lower ends similar to the conductors 12 and 13 in Fig. 1, are lowered into the well and stopped at a predetermined point. These conductors are then connected by means of a suitable switch or otherwise to the arm 32—33 as indicated at 12a—13a whereby the capacitance of the particular volume of formation between the electrodes is measured by varying the capacitance of the bridge circuit in the manner well known to those familiar with the art. Then by throwing the switch the conductors may be connected across the arm 31—30 as indicated at 12b, 13b and with such connection the inductance of the earth's circuit between the two electrodes is measured.

If the investigation is being carried out in a strata in which the conductivity of the strata is known to be high, a resonance method of measuring the capacity may be employed. A typical circuit for carrying out this method is shown in Fig. 3 and with this arrangement where the circuit 50 having a source of energy 51 is loosely coupled to the circuit 52 having a calibrated variable condenser 53 and an indicating instrument 54, the circuit 52 may be tuned by varying the calibrated condenser 53. Conductors 55 and 56 are connected to the circuit 52 on opposite sides of the condenser 53 leading to a switch 57 which in turn is adapted for connection to conductors 12c and 13c which lead down into the well and have electrodes vertically spaced from each other at their lower ends. Conductors 12c and 13c are, like conductors 12 and 13, preferably provided with means to compensate for their capacitance and inductance, one form of such compensating means being illustrated at 22 and 23 in Fig. 1 and described hereinabove. When the circuit 52 has been tuned in the manner referred to above, the switch 57 is closed thereby connecting the unknown capacitance of the volume of formation between the electrodes in the well into the circuit. The calibrated condenser 53 is again tuned and the difference between the two condenser readings obtained in this manner will give the value of the unknown capacitance or the capacitance of that section of formation which lies between the two electrodes in the well. This procedure may be repeated at different depths within the well whereby indications and measurements are obtained which are indicative of the character and contents of the strata or formation at these various depths.

It is to be understood that while I have herein described and illustrated certain preferred procedures to be followed in the practice of this invention and certain preferred circuits and apparatus which may be employed in carrying out such procedures, that the invention is not limited to the precise operations or circuits described above, but includes within its scope such changes as may fairly come within the spirit of the appended claims.

I claim as my invention:

1. The method of determining the character of subterranean formation adjacent a bore hole which comprises: maintaining a tunable electric circuit at the surface of the ground; supplying alternating current to said circuit; adjusting the capacitance of said circuit to tune the same to resonance; connecting said tunable circuit to a second circuit which includes a portion of said formation; and again adjusting the capacitance of the tunable circuit to tune the combination of said first and second circuits to resonance, thereby obtaining a capacity measurement of that portion of earth formation included in said second circuit.

2. The method of determining the character of subterranean formation adjacent a bore hole which comprises: supplying alternating current to a tunable electric circuit; adjusting one of the variable components of said tunable circuit to tune the same to resonance; connecting said tunable circuit to a second circuit which includes a portion of said formation; and again adjusting the said variable component of the tunable circuit to tune the combination of said first and second circuits to resonance thereby obtaining a measurement of the corresponding electrical component in that portion of the formation included in said second circuit.

3. The method of determining the character of subterranean formation adjacent a bore hole which comprises: maintaining a tunable electric circuit at the surface of the ground; supplying alternating current to said circuit; adjusting the capacitance of said circuit to tune the same to resonance; connecting said tunable circuit to a second circuit which includes a portion of said formation; adjusting the capacitance of said tunable circuit to tune the combination of said first and second circuits to resonance; and measuring the difference between said first and second capacitance values to obtain an indication of the capacitance of the formation included in said second circuit.

4. A method of determining the physical characteristics of subterranean formations adjacent a bore hole which includes: lowering insulated conductors with vertically spaced electrodes on their lower ends into said bore hole; maintaining a tunable electric circuit at the surface of the ground; adjusting the capacitance of said tunable circuit to tune the same to resonance; connecting said first mentioned conductors to said tunable circuit so as to include said conductors and a portion of the formation between said electrodes in said circuit; varying the capacitance of said tunable circuit so as to tune said composite circuit to resonance as said electrodes are lowered into said bore hole; measuring the difference between the original capacitance value of the tunable circuit alone and the said capacitance values of the composite circuit; and compensating for the capacitance and inductance of said conductors as they are paid out into the bore hole.

5. A method of determining the physical characteristics of subterranean formations adjacent a bore hole which includes: lowering insulated conductors with vertically spaced electrodes on their lower ends into said bore hole; maintaining a tunable electric circuit at the surface of the ground; adjusting the capacitance of said tunable circuit to tune the same to resonance; connecting the first mentioned conductors to said tunable circuit so as to include said conductors and a portion of the formation between said electrodes in said circuit; varying the capacitance of said tunable circuit so as to tune said composite circuit to resonance as said electrodes are lowered into said bore hole; measuring the difference between the original capacitance value of the tunable circuit alone and the said capacitance values of the composite circuit; and automatically compensating for the variable electrical components of said conductors as they are lowered into the well.

RALPH W. LOHMAN.